United States Patent
Upton et al.

(10) Patent No.: US 10,115,307 B1
(45) Date of Patent: Oct. 30, 2018

(54) PARKING SPACE AVAILABILITY SYSTEM

(71) Applicants: Sherece Upton, Austell, GA (US);
Michael Upton, Austell, GA (US);
Duncan Waruingi, Austell, GA (US)

(72) Inventors: Sherece Upton, Austell, GA (US);
Michael Upton, Austell, GA (US);
Duncan Waruingi, Austell, GA (US)

( * ) Notice: Subject to any disclaimer, the term of this patent is extended or adjusted under 35 U.S.C. 154(b) by 0 days.

(21) Appl. No.: 15/723,341

(22) Filed: Oct. 3, 2017

(51) Int. Cl.
| | |
|---|---|
| G08G 1/14 | (2006.01) |
| G06K 9/00 | (2006.01) |
| H04W 4/00 | (2018.01) |
| H04W 4/16 | (2009.01) |
| H04W 4/04 | (2009.01) |
| H04B 7/26 | (2006.01) |

(52) U.S. Cl.
CPC .......... *G08G 1/14* (2013.01); *G06K 9/00812* (2013.01); *H04B 7/26* (2013.01); *H04W 4/04* (2013.01); *H04W 4/16* (2013.01)

(58) Field of Classification Search
None
See application file for complete search history.

(56) References Cited

U.S. PATENT DOCUMENTS

| | | | |
|---|---|---|---|
| 6,147,624 A | 11/2000 | Clapper | |
| 7,253,747 B2 | 8/2007 | Noguchi | |
| 7,834,778 B2 | 11/2010 | Browne | |
| 7,899,583 B2 | 3/2011 | Mendelson | |
| 8,625,853 B2 * | 1/2014 | Carbonell | G06K 9/00785 382/104 |
| 9,773,414 B2 * | 9/2017 | Wang | H04W 4/80 |
| 2005/0057373 A1 * | 3/2005 | Noguchi | G08G 1/14 340/932.2 |
| 2006/0253226 A1 * | 11/2006 | Mendelson | G08G 1/14 701/1 |
| 2009/0207045 A1 * | 8/2009 | Jung | G06K 9/00798 340/932.2 |
| 2011/0133957 A1 | 6/2011 | Harbach | |
| 2012/0056758 A1 * | 3/2012 | Kuhlman | G08G 1/14 340/932.2 |
| 2012/0062395 A1 * | 3/2012 | Sonnabend | G06K 9/00791 340/932.2 |
| 2012/0095791 A1 * | 4/2012 | Stefik | G06Q 10/02 705/5 |
| 2012/0130777 A1 | 5/2012 | Kaufman | |

(Continued)

FOREIGN PATENT DOCUMENTS

WO   2014117016 A1   7/2014

*Primary Examiner* — Fekadeselassie Girma

(57) ABSTRACT

The parking space availability system is configured for use with a parking facility that further comprises a plurality of parking spaces. Each parking space contained within the plurality of parking spaces comprises an occupancy status selected from the group consisting of an open parking space and an occupied parking space. The parking space availability system comprises a surveillance device, one or more mapping devices and a wireless communication facility. The wireless communication facility wirelessly connects each of the one or more mapping devices to the surveillance device. The surveillance device forwards the location of each identified open parking space to the one or more mapping devices using the wireless communication facility. Each of the one or more mapping devices is used by a user to locate the identified open parking spaces.

14 Claims, 3 Drawing Sheets

(56) References Cited

U.S. PATENT DOCUMENTS

| | | | |
|---|---|---|---|
| 2014/0118167 A1* | 5/2014 | Im | G08G 1/092 |
| | | | 340/901 |
| 2015/0369618 A1* | 12/2015 | Barnard | H05B 37/0272 |
| | | | 701/491 |
| 2016/0189324 A1* | 6/2016 | Eramian | G06Q 50/30 |
| | | | 705/13 |
| 2016/0210860 A1* | 7/2016 | Belzner | G08G 1/147 |
| 2017/0092130 A1* | 3/2017 | Bostick | G08G 1/143 |
| 2017/0206473 A1* | 7/2017 | Dermosessian | G06Q 10/02 |
| 2017/0267233 A1* | 9/2017 | Minster | B62D 15/02 |
| 2017/0357864 A1* | 12/2017 | Welland | G06K 9/00812 |

\* cited by examiner

PARKING SPACE AVAILABILITY SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments including traffic control systems, more specifically, a traffic control system indicating individual free spaces in parking areas.

SUMMARY OF INVENTION

The parking space availability system is configured for use with a parking facility. Each parking space contained within the plurality of parking spaces comprises an occupancy status selected from the group consisting of an open parking space and an occupied parking space. The selection between an open parking space and an occupied parking space is mutually exclusive. The parking space availability system comprises a surveillance device, one or more mapping devices and a wireless communication facility. The wireless communication facility wirelessly connects each of the one or more mapping devices to the surveillance device. The surveillance device determines the selected occupancy status of each parking space selected from the plurality of parking spaces. The surveillance device forwards the location of each identified open parking space to the one or more mapping devices using the wireless communication facility. Each of the one or more mapping devices is used by a user to locate the identified open parking spaces.

These together with additional objects, features and advantages of the parking space availability system will be readily apparent to those of ordinary skill in the art upon reading the following detailed description of the presently preferred, but nonetheless illustrative, embodiments when taken in conjunction with the accompanying drawings.

In this respect, before explaining the current embodiments of the parking space availability system in detail, it is to be understood that the parking space availability system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the parking space availability system.

It is therefore important that the claims be regarded as including such equivalent construction insofar as they do not depart from the spirit and scope of the parking space availability system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
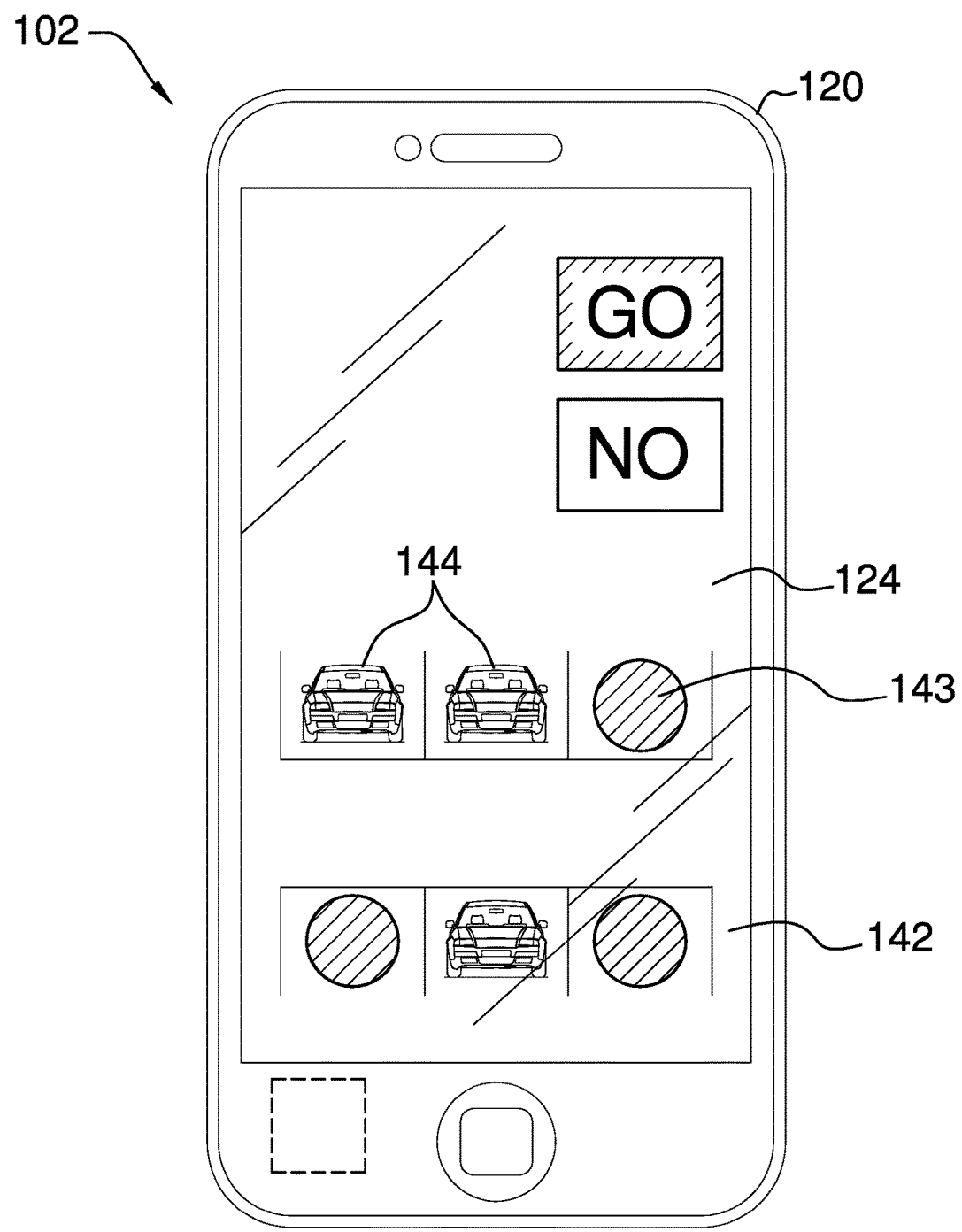
FIG. 1 is a detail view of an embodiment of the disclosure.
Figure 2:
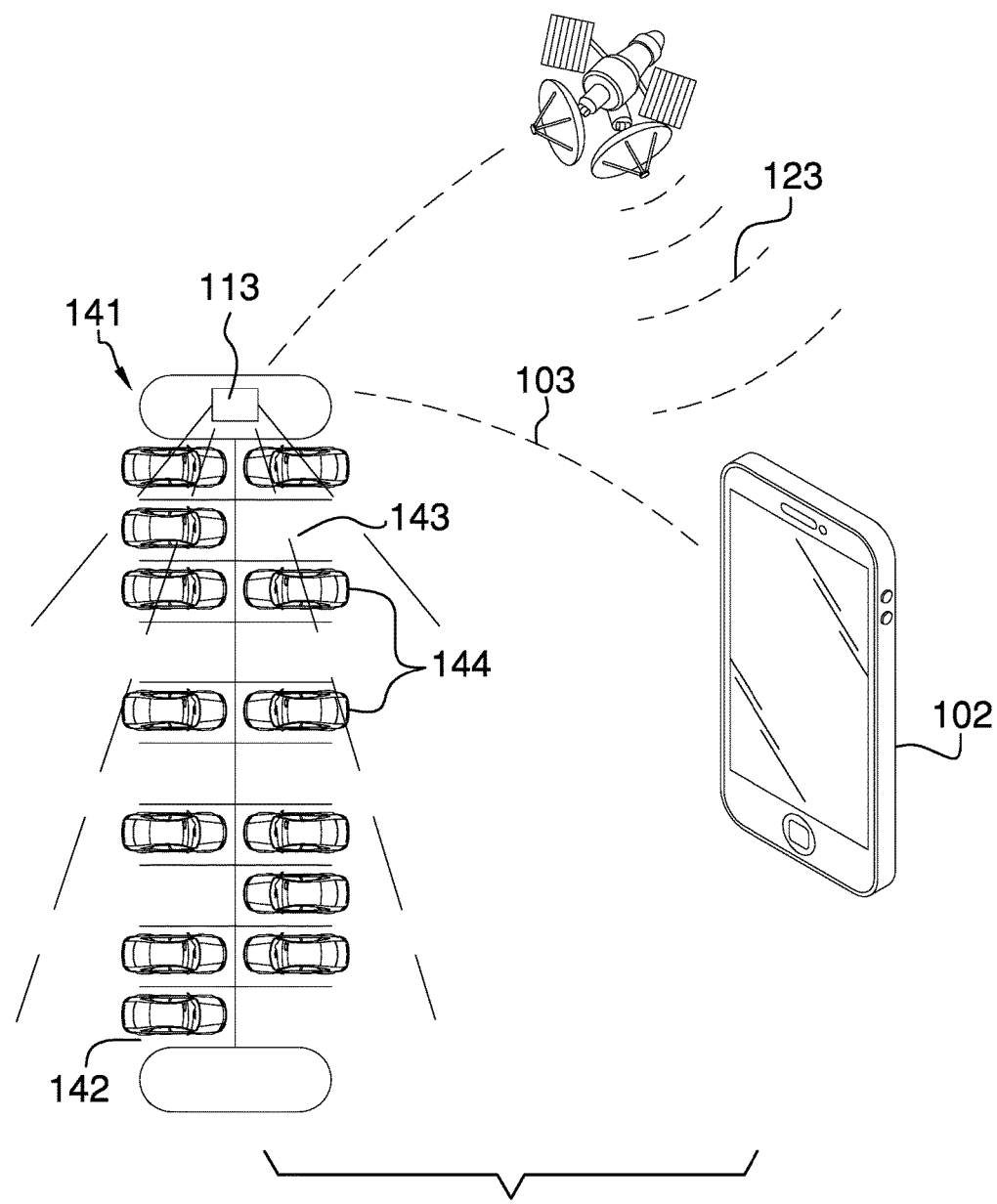
FIG. 2 is a detail view of an embodiment of the disclosure.
Figure 3:
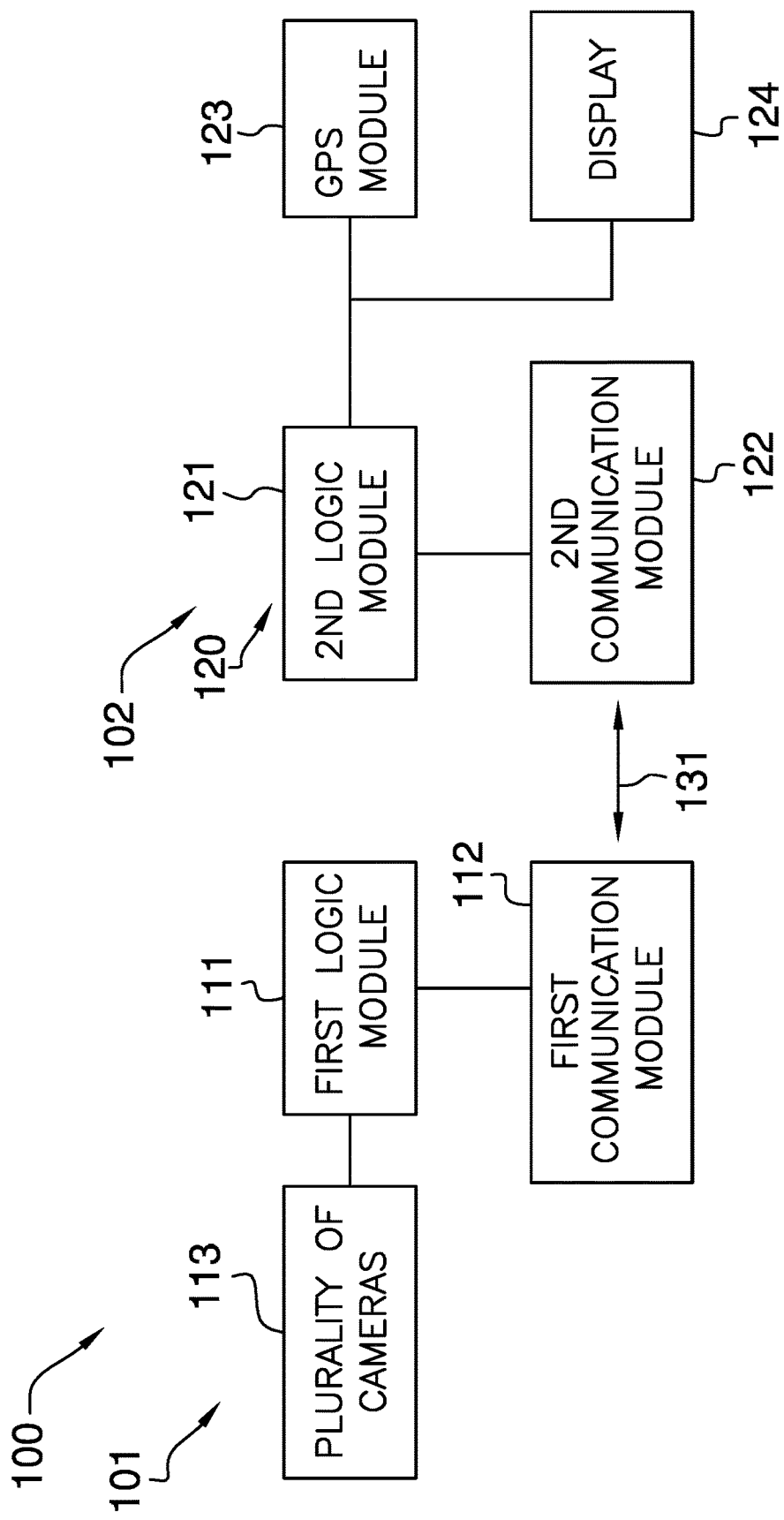
FIG. 3 is a block diagram of an embodiment of the disclosure.

Detailed reference will now be made to one or more potential embodiments of the disclosure, which are illustrated in FIGS. 1 through 3.

The parking space availability system 100 (hereinafter invention) is configured for use with a parking facility 141. Each parking space contained within the plurality of parking spaces 142 comprises an occupancy status selected from the group consisting of an open parking space 143 and an occupied parking space 144. The selection between an open parking space 143 and an occupied parking space 144 is mutually exclusive. The invention 100 comprises a surveillance device 101, one or more mapping devices 102 and a wireless communication facility 103. The wireless communication facility 103 wirelessly connects each of the one or more mapping devices 102 to the surveillance device 101. The surveillance device 101 determines the selected occupancy status of each parking space selected from the plurality of parking spaces 142. The surveillance device 101 forwards the location of each identified open parking space 143 to the one or more mapping devices 102 using the wireless communication facility 103. Each of the one or more mapping devices 102 is used via a user to locate the identified open parking spaces 143.

The parking facility 141 refers to a space or area designated for the temporary storage of one or more vehicles. Each of the plurality of parking spaces 142 is a location designated within the parking facility 141 to receive a vehicle. An open parking space 143 refers to a parking space selected from the plurality of parking spaces 142 that is unoccupied. An occupied parking space 144 refers to a parking space selected from the plurality of parking spaces 142 that is occupied.

The surveillance device 101 is an electronic device. The surveillance device 101 is an optical data processing device that: 1) individually identifies each individual parking space contained within the plurality of parking spaces 142; and, 2) determines and monitors the status of each individual parking space. Based upon the results of the optical data processing, the surveillance device 101 determines an occupancy status selected from the group consisting of an open parking space 143 and an occupied parking space 144. The surveillance device 101 further maintains a database of the GPS coordinates of each parking space contained within the plurality of parking spaces 142. The surveillance device 101 then transmits the GPS coordinates of each open parking space 143 to each of the one or more mapping devices 102 using the wireless communication facility 103.

The optical data processing capabilities required for the operation of the surveillance device 101 are well known and commercially available within the signal processing arts.

The surveillance device 101 comprises a first logic module 111, a first communication module 112, and a plurality of image sensors 113.

The first logic module 111 is a readily and commercially available programmable electronic device that is used to manage, regulate, and operate the surveillance device 101. Depending on the specific design and the selected components, the first logic module 111 can be a separate component within the surveillance device 101 or the functions of the first logic module 111 can be incorporated into another component within the surveillance device 101. The first communication module 112 is a readily and commercially available wireless electronic communication device that allows the first logic module 111 to establish the individual wireless communication link 131 with the second communication module 122 of each individual mapping device 120 selected from the one or more mapping devices 102.

Each of the plurality of image sensors 113 is used to monitor a subset of parking spaces selected from the plurality of parking spaces 142 contained within the parking facility 141. Each image sensor selected from the plurality of image sensors 113 receives light from the exterior of the selected image sensor and converts the received light into a digital representation of sufficient detail to allow the first logic module 111 to optically process the data collected by the selected image sensor. The first logic module 111 uses the collected data by the selected image sensor to: 1) identify each parking space selected from the plurality of parking spaces 142 that is within the field of view of the selected image sensor; and, 2) to determine for each identified parking space an occupancy status selected from the group consisting of an open parking space 143 and a closed parking space 144. Methods to process data collected from each of the plurality of image sensors 113 to determine the occupancy status of each of the plurality of parking spaces 142 are well known and documented in the signal processing arts.

Each of the one or more mapping devices 102 is a device that operates independently from the surveillance device 101. Each individual mapping device 120 selected from the one or more mapping devices 102: 1) determines the GPS coordinates of the individual mapping device 120; 2) receives the GPS coordinates of each open parking space 143 from the surveillance device 101; and 3) displays the location of each open parking space 143 relative to the GPS coordinates of the individual mapping device 120. Each individual mapping device 120 selected from the one or more mapping devices 102 operates independently from the individual mapping devices 120 remaining in the one or more mapping devices 102. The one or more mapping devices 102 comprises a collection of individual mapping devices 120.

Each individual mapping device 120 comprises a second logic module 121, a second communication module 122, a GPS module 123, and a display 124.

The second logic module 121 is a readily and commercially available programmable electronic device that is used to manage, regulate, and operate each individual mapping device 120 selected from the one or more mapping devices 102. Depending on the specific design and the selected components, the second logic module 121 can be a separate component within the selected individual mapping device 120 or the functions of the second logic module 121 can be incorporated into another component within the selected individual mapping device 120. The second communication module 122 is a readily and commercially available wireless electronic communication device that allows the second logic module 121 to establish the individual wireless communication link 131 with the first communication module 112 of the surveillance device 101.

The GPS module 123 is an electrical device that communicates with the GPS to determine the GPS coordinates of the GPS module 123. When queried by the second logic module 121, the GPS module 123 transfers the GPS coordinates to the second logic module 121.

The second logic module 121 uses the GPS coordinates provided by the GPS module 123 to locate the individual mapping device 120 using commercially available mapping software that is operated by the second logic module 121. The second logic module 121 uses the GPS coordinates received from the surveillance device 101 over the individual wireless communication link 131 to locate each open parking space 143 using the commercially available mapping software. The second logic module 121 prepares an image of a map of the parking facility 141 upon which is overlaid: 1) the location of the one or more mapping devices 102; and, 2) the location of each open parking space 143 within the parking facility 141. The second logic module 121 displays the prepared image using the display 124. The display 124 is a well-known and commercially available electronic device that is used to generate images.

The wireless communication facility 103 refers to a communication mechanism that allows the surveillance device 101 to communicate the GPS coordinates of each identified open parking space 143 to each of the one or more mapping devices 102. The wireless communication facility 103 uses a wireless communication protocol. In the first potential embodiment of the disclosure, the wireless communication facility 103 uses a WiFi protocol.

The wireless communication facility 103 comprises a collection of individual wireless communication links 131. The individual wireless communication link 131 refers to an individual communication link that is established between a selected individual mapping device 120 and the surveillance device 101. Each individual wireless communication link 131 is unique to the selected individual mapping device 120. Stated differently, no two individual mapping devices 120 share an individual wireless communication link 131.

To use the invention 100, an individual mapping device 120 enters the parking facility 141 and establishes the individual wireless communication link 131 with the surveillance device 101. Once the individual wireless communication link 131 is established, the invention 100 operates as described elsewhere in this disclosure.

The following definitions were used in this disclosure:

Camera: As used in this disclosure, a camera is a sensor that converts light into electric signals that encode and records the spatial orientation of the captured light in a manner that reproduces the images seen by a human eye.

Database: As used in this disclosure, a database refers to: 1) a set of data that is organized and stored in a manner that allows for the search and retrieval of data from the data set; or, 2) the electronic device that stores and organizes a data set as described in the first definition.

Display: As used in this disclosure, a display is a surface upon which is presented an image, potentially including, but not limited to, graphic images and text, that is interpretable by an individual viewing the projected image in a meaningful manner.

GPS: As used in this disclosure, depending on the context GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Image: As used in this disclosure, an image is an optical representation or reproduction of a sentiment or of the appearance of something or someone.

Image Sensor: As used in this disclosure, an image sensor receives light from the exterior of the image sensor and converts the received light into a digital representation of sufficient detail to allow a logic module to create and display a visual reproduction of the source of the captured light. An image sensor is often referred to as a camera.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Mutually Exclusive: As used in this disclosure, mutually exclusive refers to two or more conditions or events that that cannot occur simultaneously.

Optical Data Processor: As used in this disclosure, an optical data processor refers to a collection of commercially available algorithms that process a digital representation of an image in a manner that allows an electronically operated device, such as a computer, to extract data from the digital representation of the image and take a subsequent action based on the data extracted from the image.

Personal Data Device: As used in this disclosure, a personal data device is a handheld device that is used for managing personal information and communication. Examples of personal data device include, but are not limited to, cellular phones, tablets and smart phones.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

WiFi: As used in this disclosure, WiFi refers to the physical implementation of a collection of wireless electronic communication standards commonly referred to as IEEE 802.11x.

Wireless: As used in this disclosure, wireless is an adjective that is used to describe a communication channel between two terminals that does not require the use of physical cabling.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A traffic control system comprising
a surveillance device, one or more mapping devices and a wireless communication facility;
wherein the wireless communication facility wirelessly connects each of the one or more mapping devices to the surveillance device;
wherein the traffic control system is configured for use with a parking facility;
wherein the parking facility comprises a plurality of parking spaces;
wherein each parking space contained within the plurality of parking spaces comprises an occupancy status selected from the group consisting of an open parking space and an occupied parking space;
wherein the selection between an open parking space and an occupied parking space is mutually exclusive;
wherein the surveillance device determines the selected occupancy status of each parking space selected from the plurality of parking spaces;
wherein the surveillance device transmits the location of each identified open parking space to the one or more mapping devices using the wireless communication facility;
wherein each of the one or more mapping devices locates the identified open parking spaces;
wherein the surveillance device is an electronic device;
wherein the surveillance device is an optical data processing device;
wherein the surveillance device individually identifies each individual parking space contained within the plurality of parking spaces;
wherein the surveillance device optically determines and monitors the status of each individual parking space;
wherein the surveillance device further maintains a database of the GPS coordinates of each parking space contained within the plurality of parking spaces;
wherein the surveillance device transmits the GPS coordinates of each open parking space to each of the one or more mapping devices using the wireless communication facility;
wherein the surveillance device comprises a first logic module, a first communication module, and a plurality of image sensors;
wherein the first communication module is electrically connected to the first logic module;

where each of the plurality of image sensors is electrically connected to the first logic module;

wherein the first logic module is a programmable electronic device;

wherein each image sensor selected from the plurality of image sensors receives light from the exterior of the selected image sensor and converts the received light into a digital representation.

2. The traffic control system according to claim 1 wherein each of the plurality of image sensors monitors a subset of parking spaces selected from the plurality of parking spaces contained within the parking facility.

3. The traffic control system according to claim 2 wherein the first communication module is a wireless communication device;

wherein the first communication module is establishes a wireless communication link with each individual mapping device selected from the one or more mapping devices.

4. The traffic control system according to claim 3 wherein the first logic module optically processes the data collected by the selected image sensor to identify each parking space selected from the plurality of parking spaces that is within the field of view of the selected image sensor;

wherein the first logic module optically processes the data collected by the selected image sensor to determine for each identified parking space an occupancy status selected from the group consisting of an open parking space and a closed parking space.

5. The traffic control system according to claim 4 wherein each of the one or more mapping devices is a device that operates independently from the surveillance device.

6. The traffic control system according to claim 5 wherein each individual mapping device selected from the one or more mapping devices determines the GPS coordinates of the individual mapping device;

wherein each individual mapping device selected from the one or more mapping devices receives the GPS coordinates of each open parking space from the surveillance device wherein each individual mapping device selected from the one or more mapping devices displays the location of each open parking space relative to the GPS coordinates of the individual mapping device.

7. The traffic control system according to claim 6 wherein the one or more mapping devices comprises a collection of individual mapping devices.

8. The traffic control system according to claim 7 wherein each individual mapping device selected from the one or more mapping devices operates independently from the individual mapping devices remaining in the one or more mapping devices.

9. The traffic control system according to claim 8 wherein each individual mapping device comprises a second logic module, a second communication module, a GPS module, and a display;

wherein the second communication module is electrically connected to the second logic module;

wherein the GPS module is electrically connected to the second logic module;

wherein the display is electrically connected to the second logic module.

10. The traffic control system according to claim 9 wherein the second logic module is a programmable electronic device;

wherein the second communication module is a wireless electronic communication device;

wherein the second communication module establishes an individual wireless communication link with the first communication module of the surveillance device;

wherein the wireless communication facility comprises the collection of individual wireless communication links created by each of the one or more mapping devices.

11. The traffic control system according to claim 10 wherein no two individual mapping devices share an individual wireless communication link.

12. The traffic control system according to claim 11 wherein each individual wireless communication link is unique to the selected individual mapping device.

13. The traffic control system according to claim 12 wherein the GPS module is an electrical device;

wherein the GPS module communicates with the GPS to determine the GPS coordinates of the GPS module;

wherein the GPS module transfers the GPS coordinates to the second logic module.

14. The traffic control system according to claim 13 wherein the second logic module generates an image of a map of the parking facility upon which is overlaid the location of the individual mapping device;

wherein the second logic module further overlays the location of each open parking space within the parking facility on the generated image of the map of the parking facility;

wherein the second logic module displays the generated image on the display.

* * * * *